F. H. CATHCART.
ROLLER RETAINER.
APPLICATION FILED JUNE 11, 1915.
1,220,185.
Patented Mar. 27, 1917.
2 SHEETS—SHEET 1.
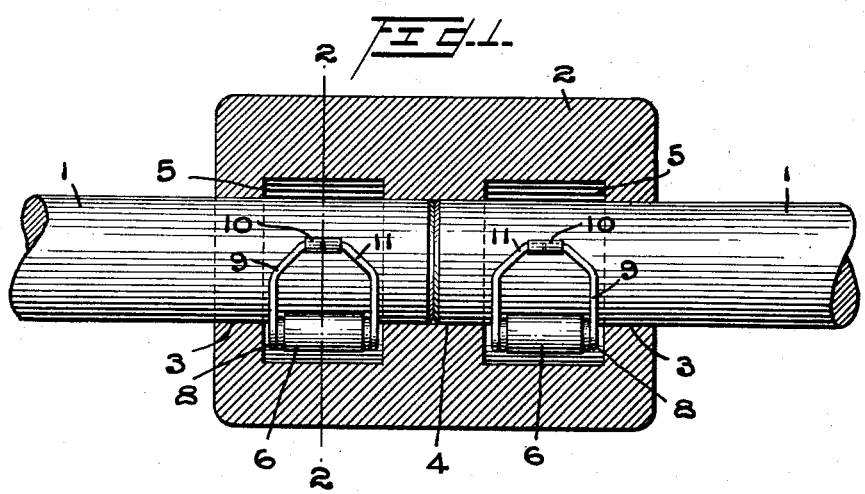
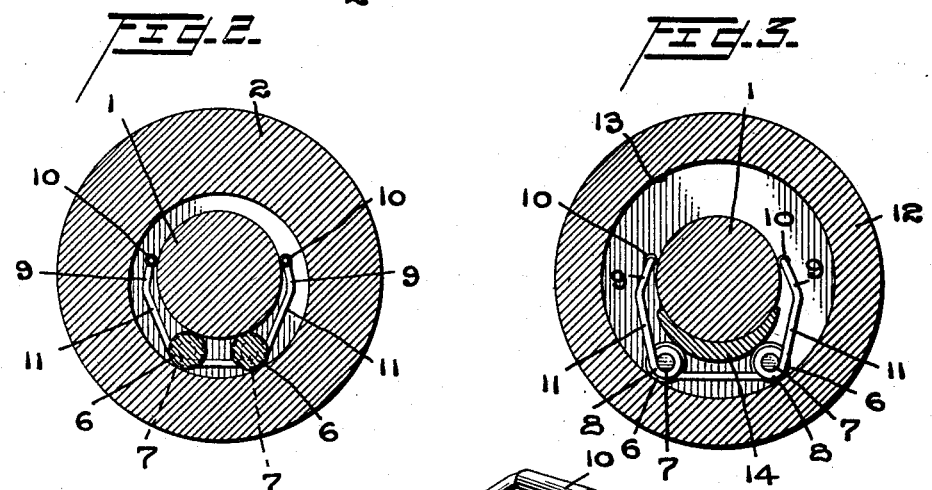
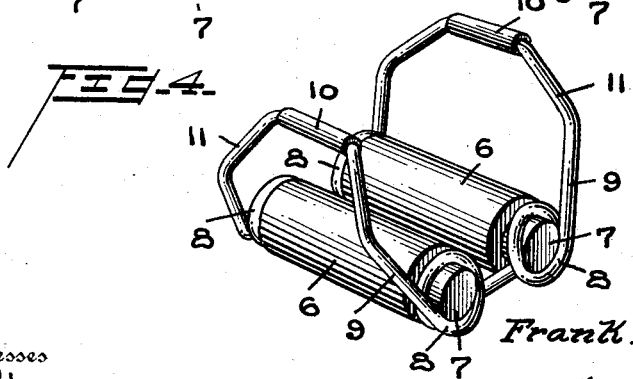
Witnesses
L. P. Moyer
C. R. Ziegler.
Inventor
Frank H. Cathcart,
By Joshua R. H. Potts.
His Attorney

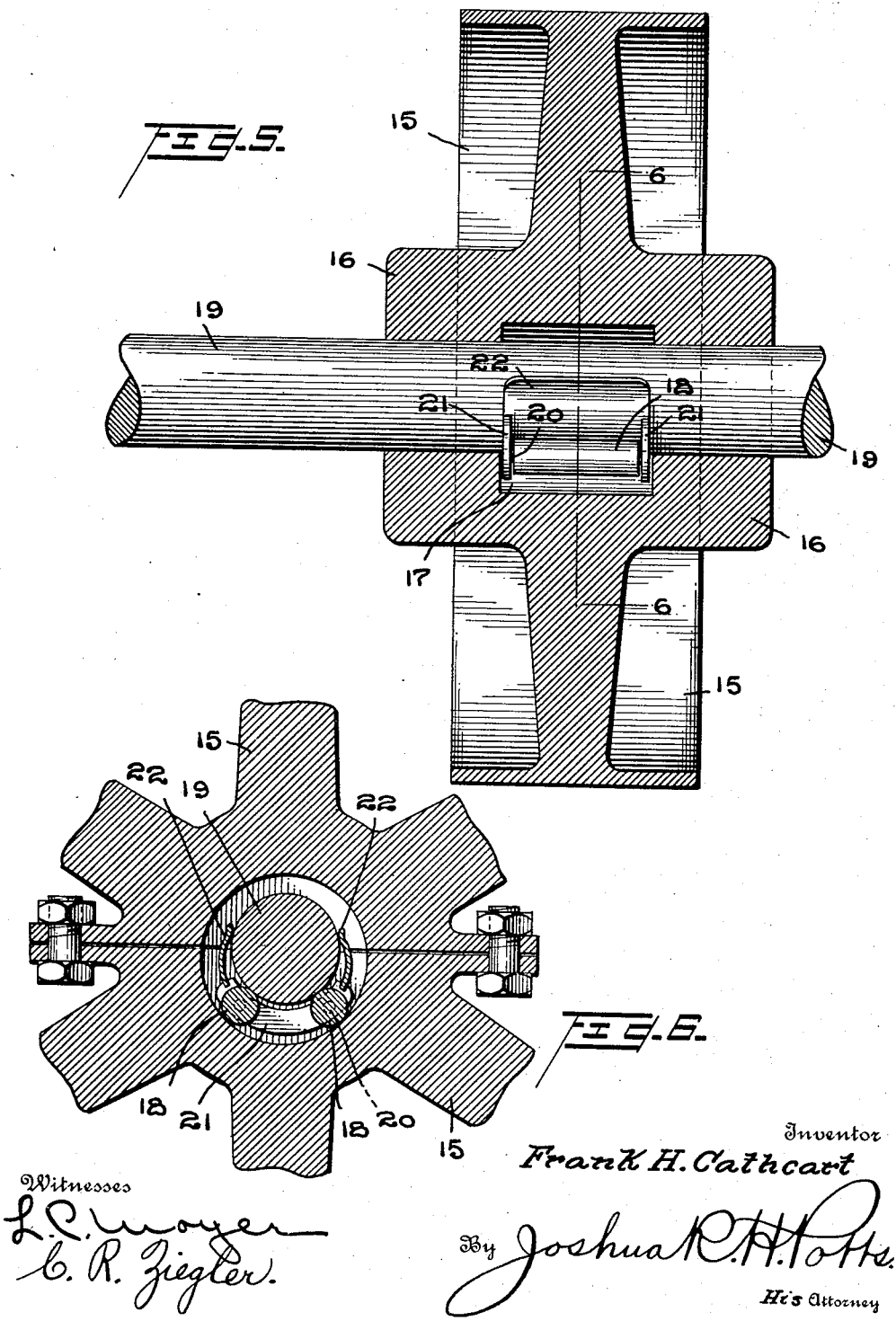

UNITED STATES PATENT OFFICE.

FRANK HENRY CATHCART, OF TRENTON, NEW JERSEY, ASSIGNOR TO AUTOMATIC SHAFT COUPLING CO., OF ALEXANDRIA, VIRGINIA, A CORPORATION OF DELAWARE.

ROLLER-RETAINER.

1,220,185.  Specification of Letters Patent.  Patented Mar. 27, 1917.

Application filed June 11, 1915. Serial No. 33,507.

*To all whom it may concern:*

Be it known that I, FRANK H. CATHCART, a citizen of the United States, residing at Trenton, in the county of Mercer and State of New Jersey, have invented certain new and useful Improvements in Roller-Retainers, of which the following is a specification.

My invention relates to improvements in roller retainers, and more particularly to roller retainers designed for use in shaft grips for shaft couplings, or hubs of pulleys or other devices, the object of the invention being to provide improved means for elastically holding a roller or rollers in contact with a shaft to compel the same to move with the shaft and insure a quick grip without danger of slipping.

A further object is to provide a roller retainer which is adapted for use in connection with a casing having an eccentric recess or with a casing having a concentric recess and in combination with a wedge.

With these and other objects in view, the invention consists in certain novel features of construction and combinations and arrangements of parts as will be more fully hereinafter described and pointed out in the claims.

In the accompanying drawings:

Figure 1 is a view in longitudinal section illustrating one form of my invention in connection with a shaft coupling.

Fig. 2 is a view in cross section on the line 2—2 of Fig. 1.

Fig. 3 is a view similar to Fig. 2 illustrating my improvements in connection with a casing having a concentric recess and employing a wedge in combination with the rollers for gripping the shaft.

Fig. 4 is a perspective view of my improved roller retainer.

Fig. 5 is a view in longitudinal section illustrating a modified form of my invention, showing the same in connection with a pulley hub, and Fig. 6 is a view in section on the line 6—6 of Fig. 5.

1, 1 represents shafts which are located in alinement and project into the casing 2 of my improved coupling. This casing 2 has bearings 3 at its ends, and a bearing 4 at its center to receive the shafts 1, and between the bearings 3 and 4, recesses 5 are provided in the casing.

The recesses 5 are eccentric to the bearings and the shaft as shown clearly in Fig. 2, and in these recesses, my improved roller retainers are located as will now be described.

6, 6, are rollers with trunnions 7 at their ends mounted to turn in bearings 8 in wire frames 9. The roller retainer consists of two frames 9 having their intermediate portions bent forming the bearings 8 above referred to, and their ends secured in tubes 10, so that they form spring gripping tongues 11 at the ends of the rollers. These spring gripping tongues 11 are of a length sufficient to engage the shaft at a point beyond the center thereof as shown clearly in Fig. 2. They grip the shaft with sufficient strength to compel the rollers to move with the shaft until the rollers wedge between the surfaces of the shafts and the recesses.

It is to be understood that this grip is only sufficient for this purpose, and does not interfere with the ready removal of the shaft or the rollers, but is merely a holding means to compel the quick action of the grip.

In Fig. 3, my invention is illustrated in connection with a casing 12 having a concentric recess 13 in which case it is necessary to employ a wedge 14 between the rollers 6 and the shaft 1 to provide the necessary grip.

In Figs. 5 and 6, I illustrate a modified form of my improved roller retainer in connection with a pulley 15. This pulley 15 has a split hub 16 in which an eccentric recess 17 is provided to accommodate the rollers 18 for locking the hub and shaft 19 together. These rollers 18 have their trunnions 20 supported in curved bars 21 at their ends, and to the ends of the curved bars, spring tongues 22 are secured. These spring tongues engage the sides of the shaft beyond the center, the same as the preferred form of my invention, and it is to be understood that this idea of spring members or flexible elastic pieces engaging the sides of the shaft to hold the rollers thereagainst may be modified in many ways without departing from my invention, and I may use my improved shaft gripping idea in connection with couplings, hubs, or any other shaft engaging devices.

The function of the roller retainer is to so hold the roller or rollers against the shaft that the gripping operation will be instantaneous with the turning of the shaft or casing, or the hub as the case may be in either direction without any slipping of the parts.

Various light changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A roller retainer for shaft grips, comprising flexible elastic means for supporting a roller, and adapted to engage a shaft, substantially as described.

2. A roller retainer of the character described, comprising two gripping tongues adapted to engage opposite sides of a shaft, and means between the tongues for supporting a roller, substantially as described.

3. The combination with a shaft, of a roller retainer of the character described, comprising bearings, rollers in the bearings, and spring tongues adapted to engage opposite sides of said shaft beyond the center of the shaft, substantially as described.

4. The combination with a shaft, of a roller retainer of the character described, comprising two wire frames having coils intermediate their ends forming bearings, rollers having trunnions on their ends located in the bearings, and devices connecting the ends of said frames forming spring tongues adapted to engage opposite sides of the shaft, substantially as described.

5. The combination with a shaft, and a casing having a recess therein around the shaft, of a roller in the recess, and a roller retainer engaging the ends of the roller and having spring tongues bearing against opposite sides of the shaft beyond the center of the latter, substantially as described.

In testimony whereof I have signed my name to this specification in the presence of two subscribing witnesses.

FRANK HENRY CATHCART.

Witnesses:
Jno. G. Graham,
Charles W. Cathcart.

Copies of this patent may be obtained for five cents each, by addressing the "Commissioner of Patents, Washington, D. C."